United States Patent
Blaner et al.

(10) Patent No.: US 9,575,728 B1
(45) Date of Patent: *Feb. 21, 2017

(54) RANDOM NUMBER GENERATION SECURITY

(71) Applicant: INTERNATIONAL BUSINESS MACHINES CORPORATION, Armonk, NY (US)

(72) Inventors: Bartholomew Blaner, Underhill Center, VT (US); Benjamin Herrenschmidt, Narrabundah ACT (AU); David A. Larson Stanton, Rochester, MN (US); Derek E. Williams, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/082,094

(22) Filed: Mar. 28, 2016

Related U.S. Application Data

(63) Continuation of application No. 14/960,479, filed on Dec. 7, 2015, now Pat. No. 9,417,846.

(51) Int. Cl.
*G06F 1/02* (2006.01)
*G06F 7/58* (2006.01)

(52) U.S. Cl.
CPC .................. *G06F 7/588* (2013.01)

(58) Field of Classification Search
CPC ....................................... G06F 7/588
USPC ................................. 708/250–256
See application file for complete search history.

(56) References Cited

U.S. PATENT DOCUMENTS

| | | | | |
|---|---|---|---|---|
| 2004/0064491 A1* | 4/2004 | Rarick | ................... | G06F 7/588 708/250 |
| 2010/0106756 A1* | 4/2010 | Ellison | ..................... | G06F 7/58 708/212 |
| 2011/0189565 A1* | 8/2011 | Ukai | ...................... | C01B 3/384 429/425 |

OTHER PUBLICATIONS

Blaner et al. "Techniques for Improving Random No. Generation Security", Filing date: Dec. 7, 2015, U.S. Appl. No. 14/960,479 Notice of Allowance dated Apr. 13, 2016.

* cited by examiner

*Primary Examiner* — Tan V. Mai
(74) *Attorney, Agent, or Firm* — Michael R. Long; Steven L. Bennett

(57) ABSTRACT

A technique for improving random number generation (RNG) security for a data processing system includes a storage subsystem of a processing unit receiving a first deliver a random number (DARN) operation. The storage subsystem issues the first DARN operation with a first value, retrieved from a first base address register (BAR), on a first bus. The processing unit receives (from a first RNG unit) at least one of a first data and a first indication (that indicate whether the first RNG unit is functional) when a second value stored in a second BAR of the first RNG unit is the same as the first value. In response to the first and second values not being the same or the first RNG unit not being functional, the storage subsystem issues the first DARN operation with the first value on a second bus that is coupled to a second RNG unit.

12 Claims, 7 Drawing Sheets

RANDOM NUMBER GENERATION SECURITY

BACKGROUND

The present disclosure is generally directed to random number generation and, more particularly, to techniques for improving random number generation security in a data processing system.

Random number generators (RNGs) may be employed in various applications, such as computer simulation, statistical sampling, cryptography, and other areas where producing an unpredictable result is desirable. There are two primary approaches for generating random numbers. A first approach measures some physical phenomenon that is expected to be random and then compensates for possible biases in the measurement process. For example, atmospheric noise, thermal noise, and other external electromagnetic and quantum phenomena may be utilized to generate random numbers. A second approach employs computational algorithms that can produce long sequences of apparently random numbers, which are, in fact, completely determined by a shorter initial value (i.e., a seed value). Unfortunately, if the seed value is known or readily discernible, a random sequence generated by a computational algorithm based on the seed value may be readily reproduced.

In general, pseudo (software) RNGs do not rely on sources of naturally occurring entropy, although they may be periodically seeded by such sources. While a software RNG based solely on deterministic logic can never be regarded as a true random number source, in practice software RNGs are sufficient for many applications. In applications where unpredictability is demanded, e.g., security applications, hardware RNGs are generally preferable to software RNGs that implement pseudo random algorithms. In computing, a hardware RNG is an apparatus that generates random numbers from a physical process, as contrasted with pseudo random numbers generated by a computer program. Hardware RNGs usually utilize phenomena that generate low-level statistically random noise signals (e.g., thermal noise, the photoelectric effect, and other quantum phenomena). A hardware RNG typically includes: a transducer that converts some aspect of a physical phenomena to an electrical signal; an amplifier and other electronic circuitry to increase the amplitude of the random fluctuations to a measurable level; and some type of analog-to-digital converter to convert an analog input signal to a digital output signal. By repeatedly sampling a randomly varying signal to provide different seeds, a series of random numbers may be obtained from a hardware RNG.

A primary application for hardware RNGs is cryptography, where hardware RNGs are used to generate cryptographic keys for secure data transmission. For example, hardware RNGs are widely used in various Internet encryption protocols, e.g., secure sockets layer (SSL). Hardware RNGs generally produce a limited number of random bits per second. In order to increase the data rate, hardware RNGs may be used to generate a seed for a faster cryptographically secure software RNG that generates a pseudo random output sequence. Hardware RNGs are generally a more secure alternative to software RNGs, which are software programs commonly used in computers to generate random numbers. Software RNGs employ a deterministic algorithm to produce numerical sequences. While pseudo random numerical sequences usually pass statistical pattern tests for randomness, by knowing the algorithm and the conditions used to initialize the algorithm (i.e., the seed), the output of a software RNG can be predicted. That is, a sequence of numbers produced by a software RNG may be predictable and data encrypted with pseudo random numbers provided by a software RNG is potentially vulnerable to being decrypted by an unrelated third-party. In contrast, hardware RNGs produce sequences of numbers that are not predictable and, therefore, provide greater security than software RNGs when used to encrypt data.

BRIEF SUMMARY

Disclosed are a method, a data processing system, and a computer program product (e.g., in the form of a design file embodied in a computer-readable storage device) for improving random number generation security.

A technique for improving random number generation security for a data processing system includes receiving, at a storage subsystem, a first deliver a random number (DARN) operation from a processor core associated with the storage subsystem. The processor core is included in a processing unit included among first processing units of a first processing cluster. In response to receiving the first DARN operation at the storage system, the storage subsystem retrieves a first value from a first base address register (BAR) of the storage subsystem. The first value corresponds to an address of an assigned random number generator (RNG) unit. The storage subsystem issues the first DARN operation with the first value on a first bus. The first bus couples the first processing units to a first RNG unit.

In response to issuing the first DARN operation on the first bus, the processing unit receives at least one of a first data and a first indication from the first RNG unit when a second value stored in a second BAR of the first RNG unit is the same as the first value. At least one of the first data and the first indication specifies whether the first RNG unit is functional. In response to the first value not being the same as the second value or the first RNG unit not being functional, the storage subsystem issues the first DARN operation with the first value on a second bus that couples the first processing units to a second processing cluster that includes second processing units and an associated second RNG unit.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (e.g., in the form of a design file embodied in a computer-readable storage device) for improving random number generation security.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

Figure 1:
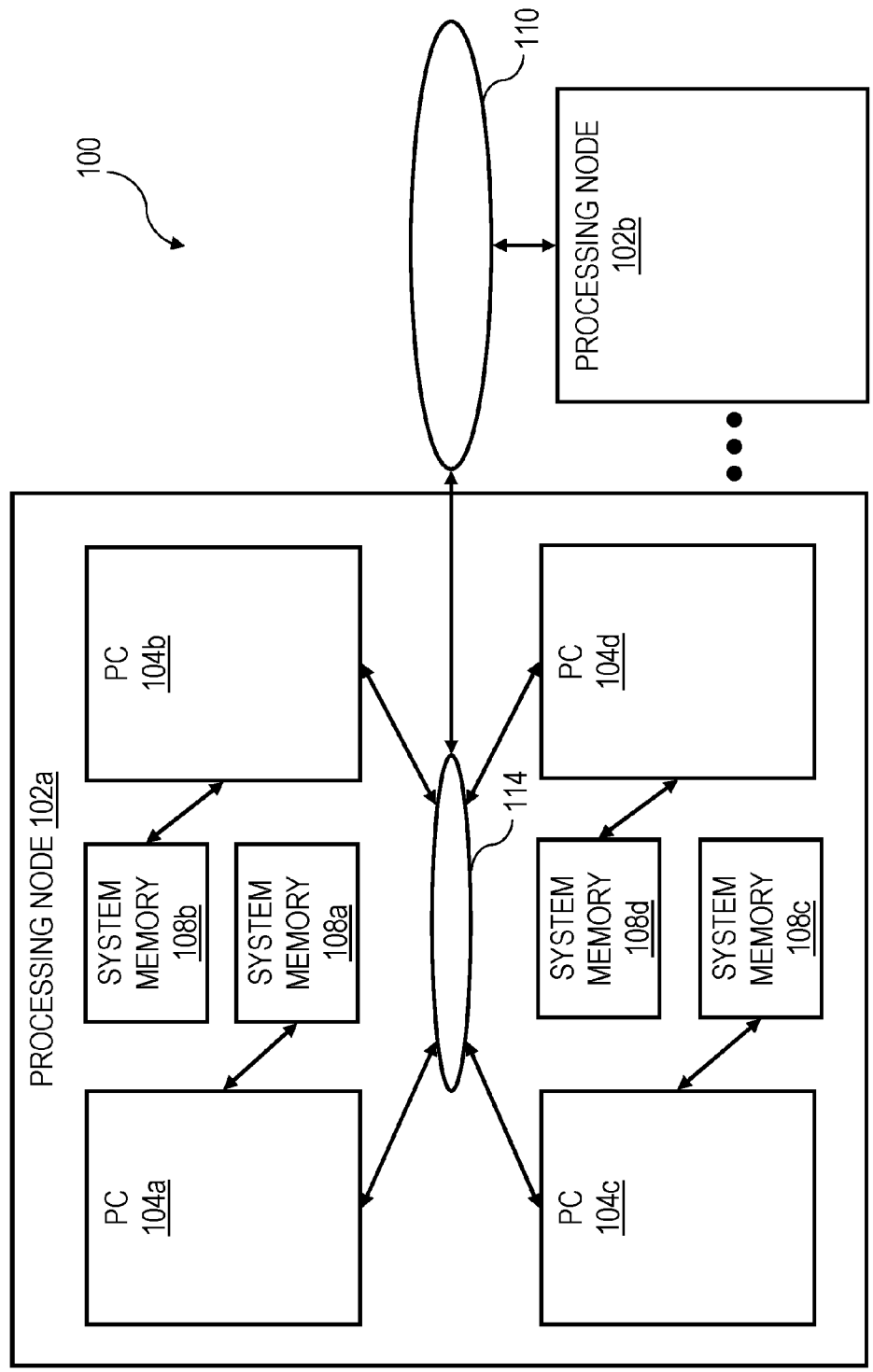
FIG. 1 is a diagram of a relevant portion of an exemplary data processing system that includes multiple processing nodes, each of which includes multiple processing clusters (PCs) configured according to embodiments of the present disclosure.

With reference to FIG. 1, a high level block diagram of an exemplary embodiment of a cache coherent symmetric multiprocessor (SMP) data processing system 100 in accordance with the present disclosure is illustrated. As shown, data processing system 100 includes multiple processing nodes 102a, 102b for processing data and instructions. While only two processing nodes are illustrated in FIG. 1 it should be appreciated that a data processing system configured according to the present disclosure may include more or less than two processing nodes. Processing nodes 102a, 102b are coupled to a system interconnect 110 for conveying address, data, and control information between processing nodes 102a, 102b. System interconnect 110 may be implemented, for example, as a bused interconnect, a switched interconnect, or a hybrid interconnect.

In the depicted embodiment, each processing node 102 may be realized as a multi-chip module (MCM) containing four processing clusters (PCs) 104a-104d, each of which may be realized as a respective integrated circuit (IC). It should be appreciated that a processing node configured according to the present disclosure may include more or less than four processing clusters. The processing clusters 104a-104d within each processing node 102 are coupled for communication by a local interconnect 114, which, like system interconnect 110, may be implemented with one or more buses and/or switches.

The devices coupled to each local interconnect 114 include processing clusters 104, in addition to other devices (not specifically listed). Data and instructions residing in system memories 108 can generally be accessed and modified by a processor core in any processing cluster 104 in any processing node 102 of data processing system 100. In alternative embodiments, one or more system memories 108 can be coupled to local interconnect 114 and/or system interconnect 110 rather than processing clusters 104.

Those skilled in the art will appreciate that data processing system 100 can include many additional components, such as interconnect bridges, non-volatile storage, ports for connection to networks or attached devices, etc. For brevity, additional components that are not necessary for an understanding of the present disclosure are not illustrated in FIG. 1 or discussed further herein. It should also be understood, however, that the enhancements provided by the present disclosure are applicable to data processing systems of diverse architectures and are in no way limited to the generalized data processing system architecture illustrated in FIG. 1.

Figure 2:
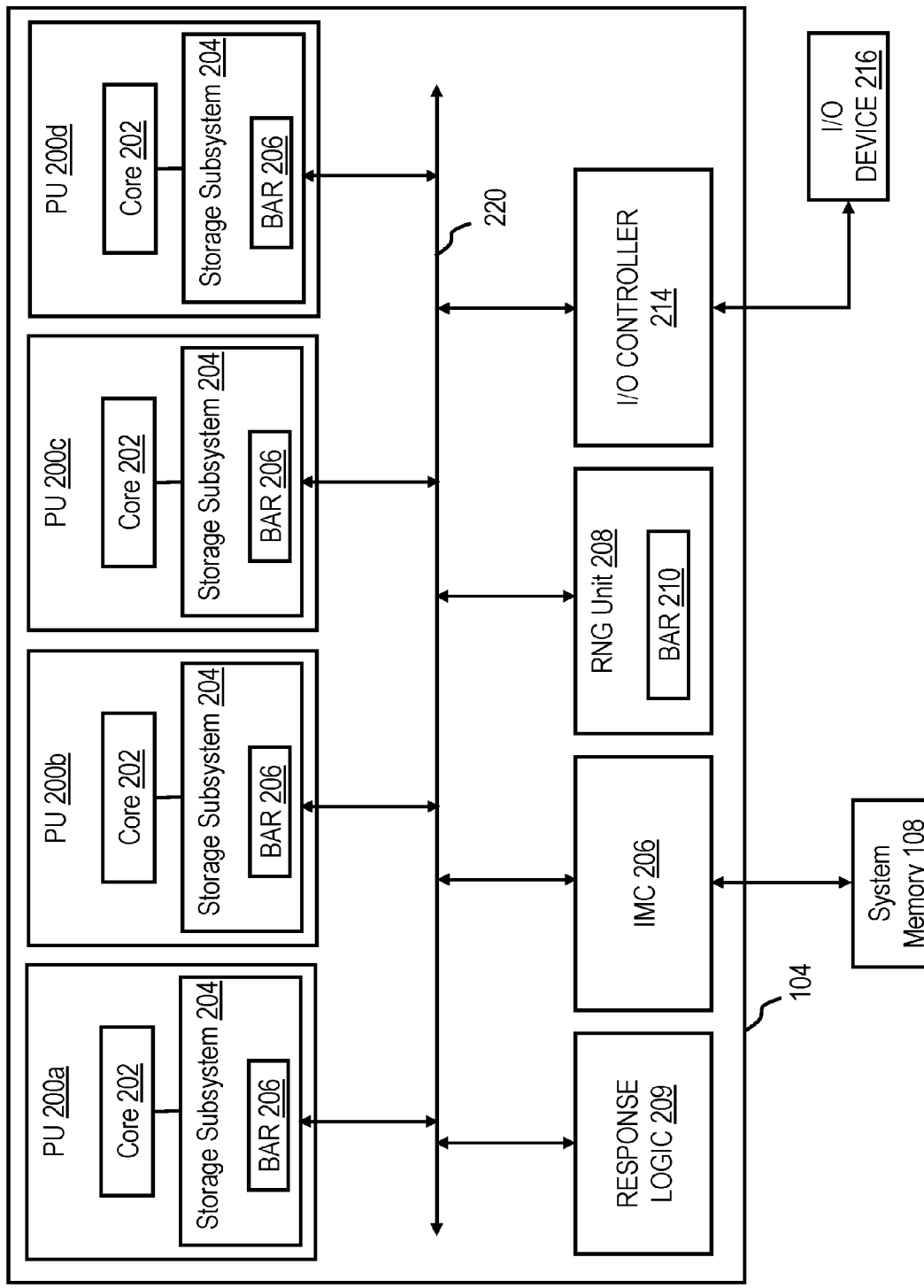
FIG. 2 is a diagram of a relevant portion of one of the PCs of FIG. 1, which includes multiple processing units (PUs), configured according to an embodiment of the present disclosure.

Referring now to FIG. 2, a more detailed block diagram of an exemplary processing cluster 104 in accordance with an embodiment of the present disclosure is illustrated. In the depicted embodiment, each processing cluster 104 includes four processing units (PUs) 200a-200d for independently processing instructions and data. While four processing units are illustrated in FIG. 2, it should be appreciated that a data processing system configured according to the present disclosure may include processing clusters with more or less than four processing units. Each processing unit 200 includes a processor core 202 that is coupled to a storage subsystem 204, which includes a base address register (BAR) 206 that is configured to store a value, among other information, that corresponds to an address of an associated random number generator (RNG) unit 208. As is illustrated, RNG unit 208 includes a BAR 210 that may store an address for RNG unit 208, among other information.

The operation of each processor core 202 is supported by a multi-level volatile memory hierarchy having at its lowest level shared system memory 108, and at its upper levels one or more levels of cache memory (e.g., located in processor core 202 and/or storage subsystem 204). In the depicted embodiment, each processing cluster 104 includes an integrated memory controller (IMC) 206 that controls read and write access to system memory 108 within its processing cluster 104 in response to requests received from processor cores 202 and operations snooped on local interconnect 220, which may be implemented, for example, as a bused interconnect, a switched interconnect, or a hybrid interconnect.

The cache memory hierarchy of processing cluster 104 may include a store-through level one (L1) cache (not separately shown), which may be bifurcated into separate L1 instruction and data caches, within each processor core 202 and a level two (L2) cache (not separately shown), within storage subsystem 204, utilized by processor core 202 of processing unit 200. It should be appreciated that bus 220 of each processing cluster 104 is coupled to an associated bus 114 via a first bus interface unit (not separately shown) and that each bus 114 is coupled to bus 110 via a second bus interface unit (not separately shown). It should also be appreciated that a cache hierarchy may include more than two levels of cache, which may be on-chip or off-chip in-line, lookaside, or victim cache, which may be fully inclusive, partially inclusive, or non-inclusive of the contents the upper levels of cache. Transactions may be initiated at various scopes by processor cores 202. At a first scope, "processing cluster scope", a transaction issued by processor core 202 is broadcast only on bus 220 attached to issuing processor core 202 and is visible to those processor cores 202 and agents (including RNG unit 208) attached to bus 220. At a second scope, "processing node scope", the transaction issued by processor core 202 is broadcast on bus 220 attached to the issuing processor core 202 and furthermore to bus 114 and buses 220 and associated processing clusters 104 and agents of associated processing clusters 104 within processing node 102 containing issuing processor core 202. Finally, at a third scope, "system scope", the transaction issued by processor core 202 is broadcast to all processor cores 202 and associated agents coupled to any instance of bus 220 throughout symmetric multiprocessor (SMP) data processing system 100 via buses 114, bus 110, and buses 220 within each processing node 102.

Each processing cluster 104 further includes an instance of response logic 209, which implements a portion of a distributed coherency signaling mechanism that maintains cache coherency within data processing system 100. Finally, each processing cluster 104 includes an integrated I/O (input/output) controller 214 supporting the attachment of one or more I/O devices, such as I/O device 216. I/O controller 214 may issue operations on local interconnects 220 and 114 and/or system interconnect 110 in response to requests by I/O device 216.

Figure 3:
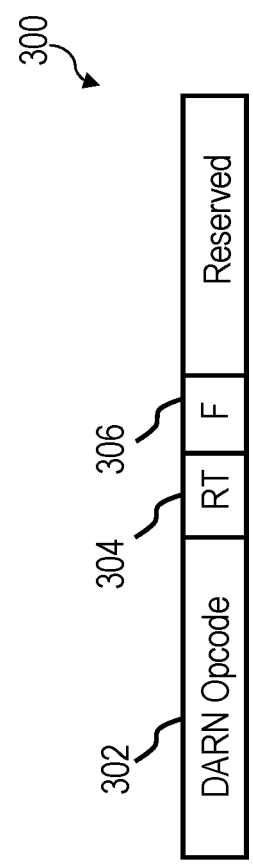
FIG. 3 depicts an exemplary structure of an exemplary deliver a random number (DARN) instruction, according to one aspect of the present disclosure.

With reference to FIG. 3, an exemplary structure for a deliver a random number (DARN) instruction 300 is illustrated, according to one aspect of the present disclosure. DARN instruction 300 includes an operation code (opcode) field 302, a register field (RT) 304, and a type field (F) 306. Opcode field 302 includes a DARN opcode, register field 304 provides an indication of what register a random number is to be returned to, and type field 306 indicates the type (e.g., raw or conditioned) of the random number to be returned from RNG unit 208. It should be appreciated that when a DARN instruction is executed successfully an addressed RNG unit 208 returns a random number of a type requested to a designated register (RT) of a requesting processor core 202. When an addressed RNG unit 208 is non-functional, a special value (e.g., all zeroes or all ones) returned to the designated register may indicate an addressed RNG 208 is non-functional and/or a separate failure indication may be returned utilizing a different communication path that indicates an addressed RNG 208 is non-functional. An RNG unit 208 may include detection logic that determines if the random numbers being generated by RNG unit 208 are of a sufficiently random quality. Upon determination that the random numbers do not meet a given quality characteristic, an RNG 208 is declared non-functional and is no longer used to return random numbers. Furthermore, RNG unit 208 signals an interrupt to system control software (either a hypervisor or operating system)—the level of system software responsible for controlling the hardware configuration of data processing system 100—that RNG unit 208 is no longer functional so that processor cores 202 mapped to the failed RNG unit 208 may be remapped to other still functional RNG units 208, if possible.

Figure 4:
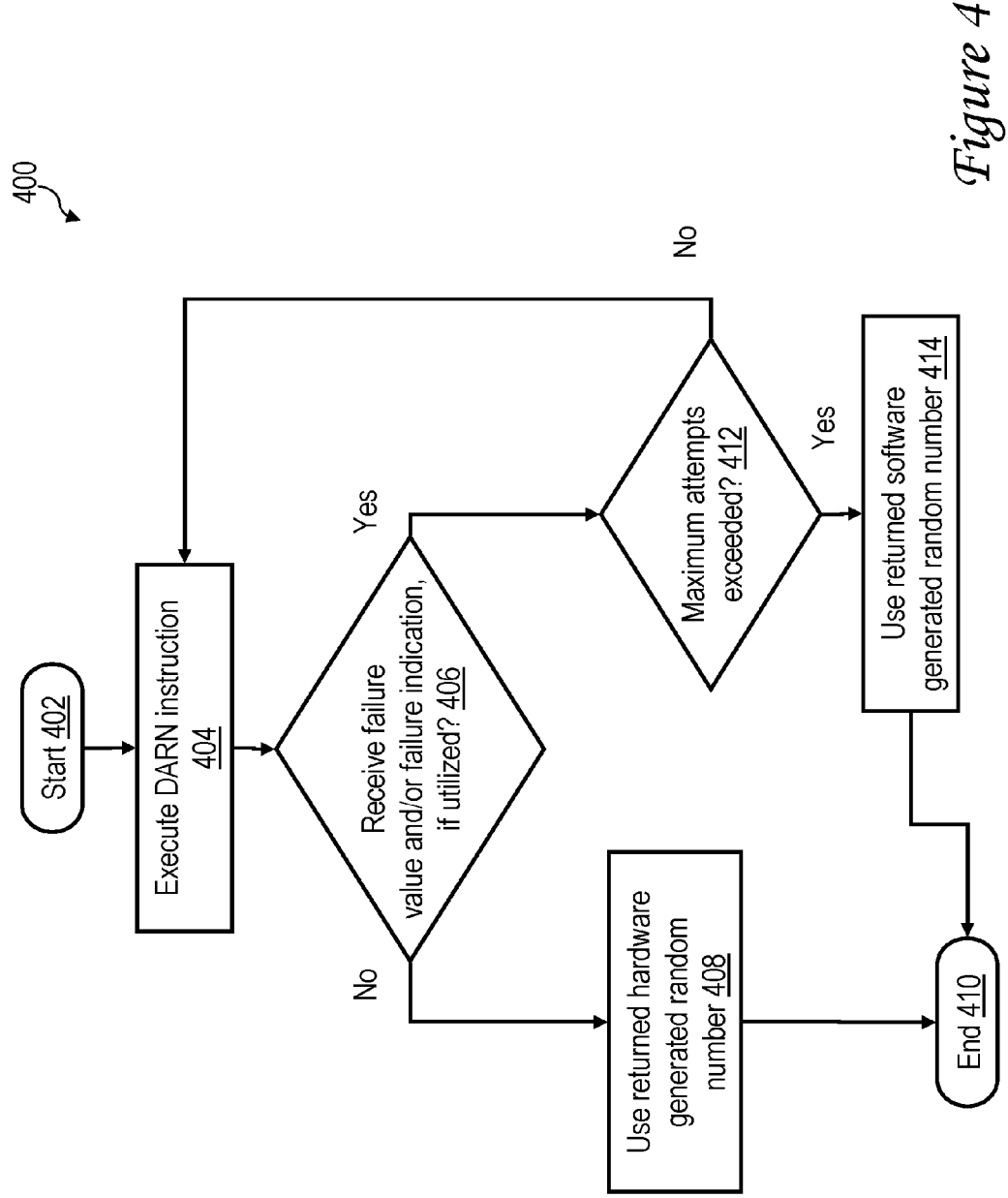
FIG. 4 depicts a flowchart of an exemplary process implemented by a processor core included in one of the PUs of FIG. 2 to receive a random number.

With reference to FIG. 4, a random number generation process 400, that is implemented by processor core 202 to retrieve a random number, is illustrated. In block 402 process 400 is initiated and control passes to block 404. In block 404, processor core 202 executes a DARN instruction. Then, in decision block 406 processor core 202 determines whether a failure value and/or failure indication, if utilized, has been received. In response to processor core 202 not receiving a failure value and/or a failure indication, control transfers from block 406 to block 408. In block 408 processor core 202 utilizes a returned hardware generated random number to, for example, encrypt a transmission. From block 408 control transfers to block 410, where process 400 terminates.

In response to processor core 202 receiving a failure value and/or a failure indication, control transfers from block 406 to decision block 412. In block 412, software executing on processor core 202 determines whether a maximum number of attempts to return a random number generated by hardware has been reached. For example, the maximum number of attempts may correspond to one attempt. In response to the maximum number of attempts not being reached in block 412 control transfers to block 404, where processor core 202 executes the DARN instruction again. In response to the maximum number of attempts being reached in block 412 control transfers to block 414, where processor core 202 uses a random number created by software to, for example, encrypt a transmission. From block 414 control transfers to block 410, where process 400 terminates.

Figure 5:
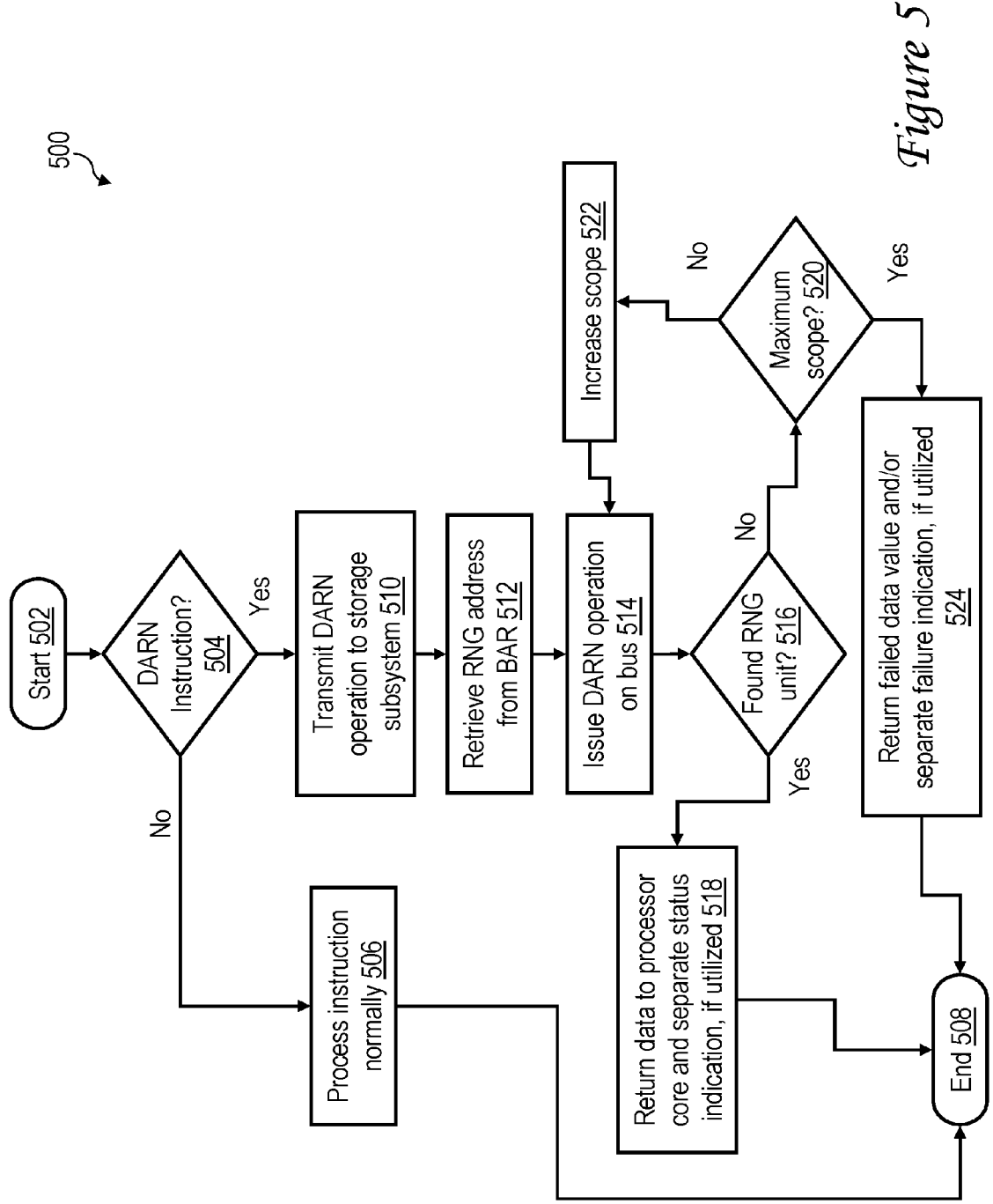
FIG. 5 depicts a flowchart of an exemplary process implemented by one of the PUs of FIG. 2 when a processor core loads an instruction.

With reference to FIG. 5, a process 500 is illustrated that is implemented by PU 104 to execute instructions, including a DARN instruction that is executed to receive a random number. In the discussion of FIG. 5, it is assumed that process 500 is initially initiated in PU 104a. In block 502 process 500 is initiated, e.g., in response to processor core 202 loading an instruction for execution. Next, in decision block 504 processor core 202 determines whether a loaded instruction is a DARN instruction. In response to the loaded instruction not being a DARN instruction in block 504 control transfers to block 506, where processor core 202 processes the instruction in a normal manner. From block 506 control transfers to block 508, where process 500 terminates.

In response to the loaded instruction being a DARN instruction in block 504 control transfers to block 510. In block 510 processor core 202 transmits a DARN operation to storage subsystem 204. Next, in block 512 storage subsystem 204 retrieves an RNG unit address from BAR 206. Then, in block 514 storage subsystem 204 first issues a DARN operation onto bus 220 utilizing a processing cluster scope and is therefore visible only to RNG unit 208 within processing cluster 104a. The DARN operation includes the RNG unit address and a random number type (specified by the 'F' field in the DARN instruction). Next, in decision block 516, it is determined whether the RNG unit address associated with the DARN operation corresponded to a value stored in BAR 210 of RNG unit 208 within processing cluster 104a. In response to the RNG unit address associated with the DARN operation issued onto bus 220 corresponding to the value stored in BAR 210 control transfers to block 518. In block 518 RNG unit 208 returns data to processor core 202 and a separate status indication, if utilized. From block 518 control transfers to block 508.

In response to the RNG unit address associated with the DARN operation on bus 220 not corresponding to the value stored in BAR 210 control transfers from block 516 to decision block 520. In block 520 storage subsystem 204 determines whether a maximum scope has been reached. In response to the maximum scope being reached in block 520 control transfers to block 524, where storage subsystem 204 returns a failure value or a failure indication, if utilized, to processor core 202. From block 524 control transfers to block 508. As a maximum scope has not been reached in a first iteration for the illustrated data processing system 100 control transfers to block 522, where storage subsystem 204 increases a scope of the DARN operation from a processing cluster scope to a processing node scope. The process of blocks 514 and 516 is repeated at a processing node scope to determine if the any of the RNG units 208 within processing clusters 104a, 104b, 104c, or 104d match the DARN operation.

If a match occurs (block 516), control transfers to block 518 which has been described. If no match occurs, control transfers to block 520 and as the maximum system scope has not been reached, control transfers again to block 522 where the scope of the DARN operation is increased to a system scope. The process of blocks 514 and 516 is then repeated at system scope to determine if any RNG unit 208 with data processing system 100 matches the DARN operation. If so, control transfers to block 518 which has been described. If no match occurs control passes to block 520 and, as has been described, because the scope is at a maximum, control then transfers to block 524 which has been described and the process terminates at block 508. It should be appreciated that more or less scopes may be implemented than the three illustrated scopes.

Broadcasting to various scopes allows for more efficient usage of interconnects 220, 114, and 110. By broadcasting to a smaller scope where possible, less interconnect resources are utilized in processing a DARN operation. Ideally, processor cores 202 are associated with an RNG unit 208 that is within the same processing cluster 104. This allows for processing cluster scope broadcasts to be used preventing DARN operation traffic from being present on interconnects 110 and 114. However, when an RNG unit 208 fails, it is possible to associate any processor core 202 with any RNG unit 208 and for the DARN operations to be processed on interconnects 110 and 114 if necessary.

Figure 6:
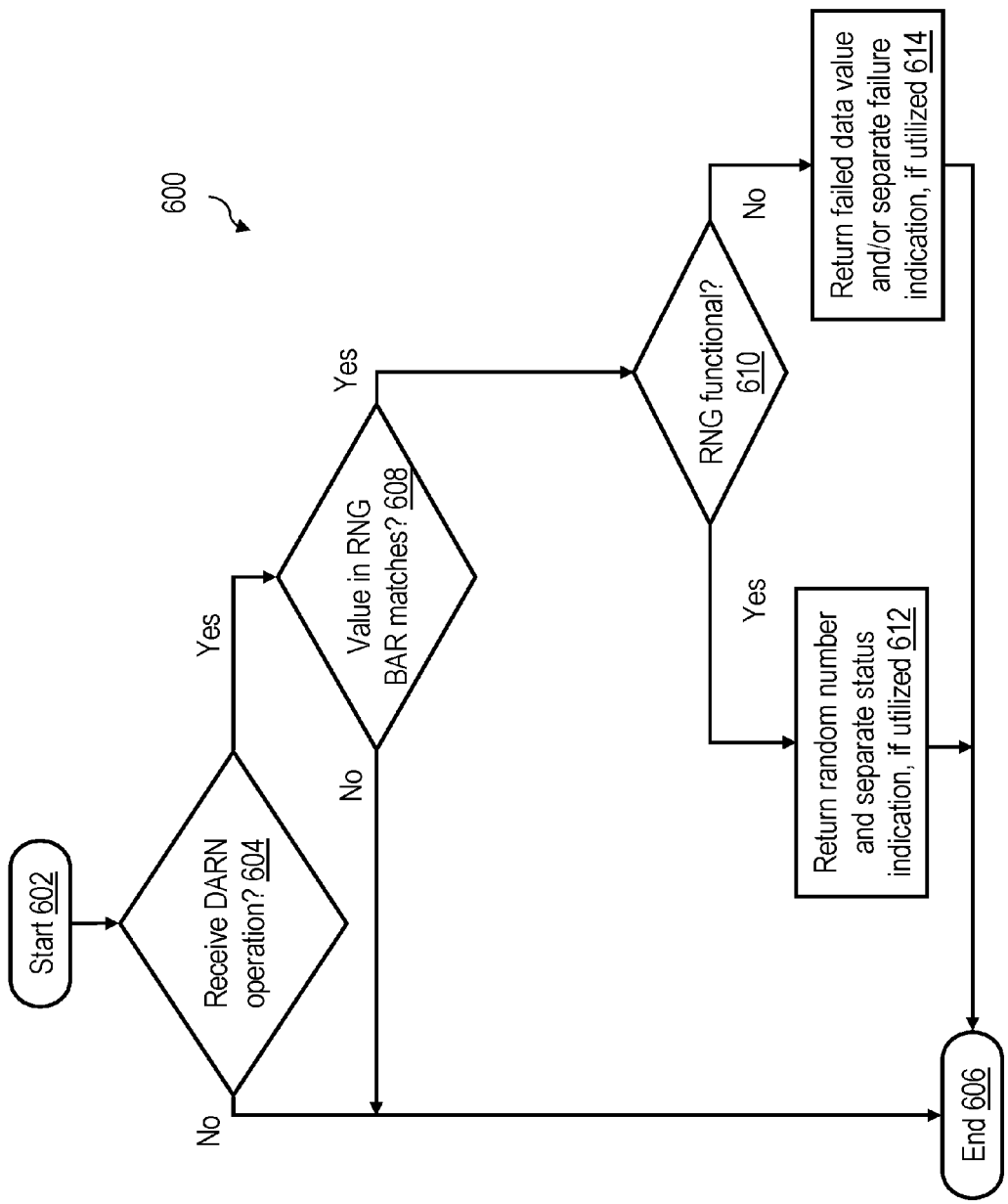
FIG. 6 depicts a flowchart of an exemplary random number generation process implemented by a random number generator (RNG) unit when a request for a DARN operation is received.

With reference to FIG. 6, a random number generation process 600 is illustrated that is implemented by RNG unit 208. In block 602 process 600 is initiated, e.g., in response to RNG unit 208 receiving an operation. Next, in decision block 604 RNG unit 208 determines whether the received operation is a DARN operation. In response to the operation not being a DARN operation in block 604 control transfers to block 606, where process 600 terminates. In response to the operation being a DARN operation in block 604 control transfers to decision block 608. In block 608 RNG unit 208 determines whether a value associated with the DARN operation matches a value stored in BAR 210. In response to the value associated with the DARN operation not matching the value stored in BAR 210 control transfers to block 606. In response to the value associated with the DARN operation matching the value stored in BAR 210 control transfers to decision block 610

In block 610 RNG unit 208 determines whether it is functional (i.e., producing random numbers whose quality is above a threshold). In response to RNG unit 208 being functional in block 610 control transfers to block 612. In block 612 RNG unit 208 returns a random number and a passed status indication, if utilized, to processor core 202. From block 610 control transfers to block 606. In response to RNG unit 208 not being functional in block 610 control transfers to block 614. In block 614 RNG unit 208 returns a failed data value and/or failed status indication, if utilized, to processor core 202. From block 614 control transfers to block 606.

Figure 7:
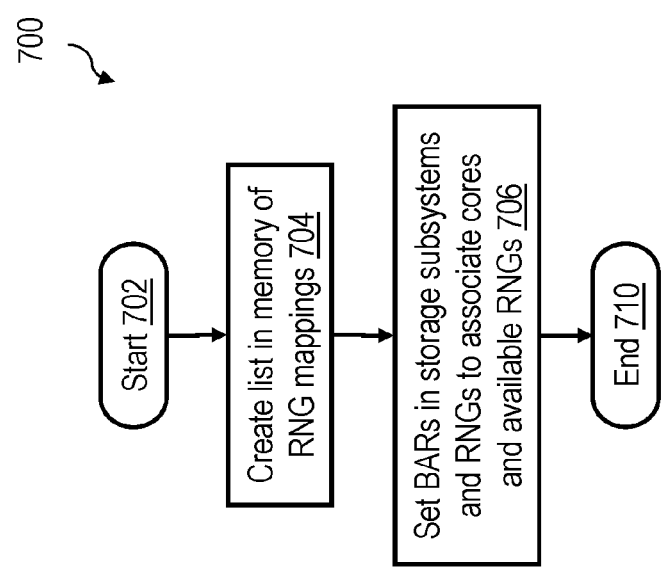
FIG. 7 depicts a flowchart of an exemplary process implemented by a system control software to associate an RNG unit with a storage subsystem of a PU.

With reference to FIG. 7, a process 700 is illustrated that is implemented by system control software (e.g., a hypervisor or operating system) to initially associate RNG units with processor cores and storage subsystems. The system control software may, for example, execute on one or more processor cores 202 of data processing system 100. In block 702 process 700 is initiated at which point control transfers to block 704. In block 704 the system control software creates a list in memory (e.g., memory 108) of RNG mappings for data processing system 100. The RNG unit mapping list assigns storage subsystems 204 to RNG units 208. Next, in block 706 the system control software sets BARs 206 in storage subsystems 204 and BARs 210 in RNG units 208 of data processing system 100 per the RNG unit mapping list to associate specific processor cores 202 with specific RNG units 208. Following block 706 process 700 terminates in block 710.

Figure 8:
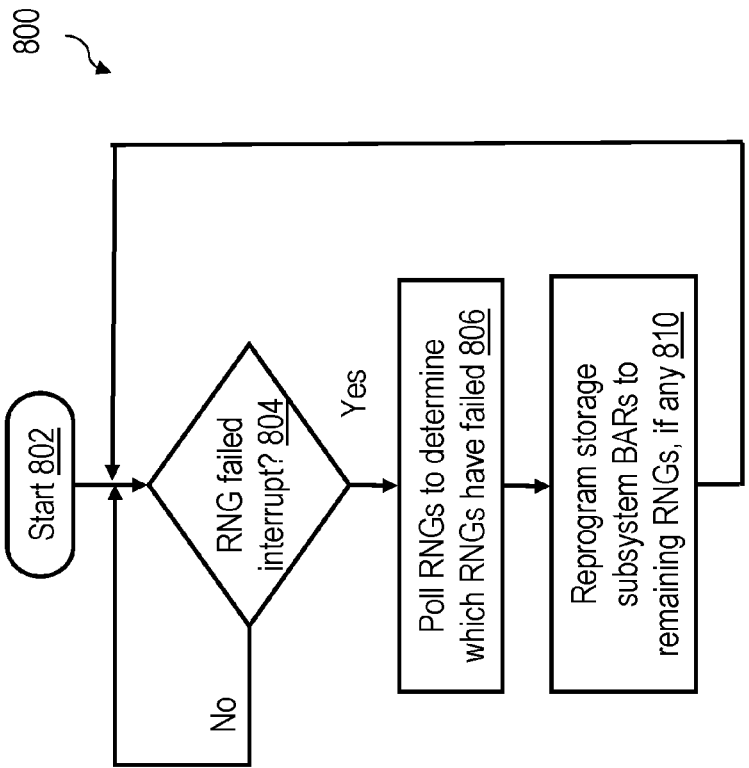
FIG. 8 is a flowchart of an exemplary process that is implemented by a system control software when an RNG unit is non-functional, according to an embodiment of the present disclosure.

With reference to FIG. 8, a process 800 is illustrated that may be implemented by system control software to handle interrupts when one or more RNG units 208 fail. In block 802 process 800 is initiated at which point control transfers to decision block 804. In block 804 system control software determines whether an interrupt has been received indicating that one of RNG units 208 is non-functional (i.e., is not providing quality random numbers, as determined by quality monitoring logic in RNG units 208). For example, a failure of one of RNG units 208 may be indicated when one of RNG units 208 provides random numbers whose quality is below a threshold level. In response to no such interrupt having been received, control loops on block 804. In response to the interrupt indicating one of RNG units 208 is non-functional control transfers from block 804 to block 806. In block 806 the system control software polls RNG units 208 to facilitate the system control software determining which ones of RNG units 208 have failed.

Then, in block 810 the system control software reprograms BARs 206 of storage subsystems 204 to functional ones of RNG units 208, if any. In response to there being no functional RNG units 208 remaining, BARs 206 may be left unmodified (i.e., BARs 206 may be left referencing a final RNG unit 208 that became non-functional to provide a failure value, or status indication if utilized, to DARN operations. As shown at blocks 406, 412, and 414 of FIG. 4, in this case all DARN operations will ultimately fail and software generated random numbers will be utilized). Following block 810 process 800 loops back to block 804.

Accordingly, techniques have been disclosed herein that advantageously improve random number generation security by providing a random number from a hardware random number generator if one is available within a data processing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of improving random number generation security for a data processing system, comprising:
   receiving, at a storage subsystem, a first deliver a random number (DARN) operation from a processor core associated with the storage subsystem, wherein the processor core is included in a processing unit included among first processing units of a first processing cluster;
   in response to receiving the first DARN operation at the storage system, retrieving, by the storage subsystem, a first value from a first base address register (BAR) of the storage subsystem, wherein the first value corresponds to an address of an assigned random number generator (RNG) unit;
   issuing, by the storage subsystem, the first DARN operation with the first value on a first bus, wherein the first bus couples the first processing units to a first RNG unit;
   in response to issuing the first DARN operation on the first bus, receiving, by the processing unit, at least one of a first data and a first indication from the first RNG unit when a second value stored in a second BAR of the first RNG unit is the same as the first value, wherein at least one of the first data and the first indication specifies whether the first RNG unit is functional; and
   in response to the first value not being the same as the second value or the first RNG unit not being functional, issuing, by the storage subsystem, the first DARN operation with the first value on a second bus that couples the first processing units to a second processing cluster that includes second processing units and an associated second RNG unit.

2. The method of claim 1, wherein the first data indicates whether the first RNG unit is functional.

3. The method of claim 1, wherein the first indication indicates whether the first RNG unit is functional.

4. The method of claim 3, wherein the first indication is provided on a different communication path from the first data.

5. The method of claim 1, wherein the first and second RNG units are within a same processing node.

6. The method of claim 1, further comprising:
   in response to issuing the second DARN operation on the second bus, receiving, by the processing unit, at least one of a second data and a second indication from the second RNG unit when a third value stored in a third BAR of the second RNG unit is the same as the first value, wherein at least one the second data and the second indication specifies whether the second RNG unit is functional; and
   in response to the first value not being the same as the third value or the second RNG unit not being functional, issuing, by the storage subsystem, the first DARN operation with the first value on a third bus that couples the first processing units to a second processing node that includes one or more additional RNG units.

7. The method of claim 1, further comprising:
   storing the first data in a register associated with the processor core.

8. The method of claim 1, wherein the first and second RNG units are within a same processing node.

9. The method of claim 1, wherein the first DARN operation with the first value also includes a type for a random number requested, and wherein the type specifies one of raw and conditioned.

10. The method of claim 1, further comprising:
    creating an RNG unit mapping list in a memory, wherein the RNG unit mapping list assigns RNG units included in the data processing system to storage subsystems included in the data processing system.

11. The method of claim 10, further comprising:
    setting values of BARs of the storage subsystems and values of BARs of the RNG units to associate the storage subsystems with the RNG units.

12. The method of claim 11, further comprising:
    removing the RNG units that are non-functional from the RNG unit mapping list;
    reassigning the storage subsystems that were assigned to the RNG units that are non-functional to one or more new RNG units that are functional in the RNG unit mapping list; and
    modifying the BARs in the reassigned storage subsystems to associate the reassigned storage subsystems with the new RNG units.

* * * * *